United States Patent [19]

Ely et al.

[11] Patent Number: 4,516,745

[45] Date of Patent: May 14, 1985

[54] PNEUMATIC DEICER AND DEICING METHOD

[75] Inventors: Duain N. Ely, Uniontown; Joseph H. Macarchenia, Tallmadge, both of Ohio

[73] Assignee: B. F. Goodrich Company, New York, N.Y.

[21] Appl. No.: 431,952

[22] Filed: Sep. 30, 1982

[51] Int. Cl.³ .............................................. B64D 15/18
[52] U.S. Cl. ................................................ 244/134 A
[58] Field of Search .............. 244/134 A, 134 R, 219

[56] References Cited

U.S. PATENT DOCUMENTS

| | | | |
|---|---|---|---|
| 2,204,122 | 6/1940 | Colley | 244/134 A |
| 2,440,533 | 4/1948 | Antonson | 244/134 A |
| 3,604,666 | 9/1971 | Achberger | 244/134 A |
| 3,623,684 | 11/1971 | Kline | 244/134 A |

Primary Examiner—Galen L. Barefoot
Attorney, Agent, or Firm—Michael J. Colitz, Jr; Woodrow W. Ban

[57] ABSTRACT

An inflatable deicer boot for mounting on an airfoil with at least one leading edge tubular member positioned in the area of the stagnation line of the airfoil. The boot also has a plurality of upper and lower inflatable passages on either side of the leading edge tubular member. In the inflation sequence of the deicing cycle, the leading edge tubular member is inflated before inflation of the upper and lower inflatable passages to crack the ice formed on the outside surface of the boot at the stagnation line of the airfoil. The upper and lower inflatable passages are then inflated to shatter and eject the ice formed on the boot over the upper and lower inflatable passages. Means are then provided to deflate the tubular member for a predetermined time after which the deicing cycle is repeated.

6 Claims, 4 Drawing Figures

U.S. Patent   May 14, 1985   4,516,745
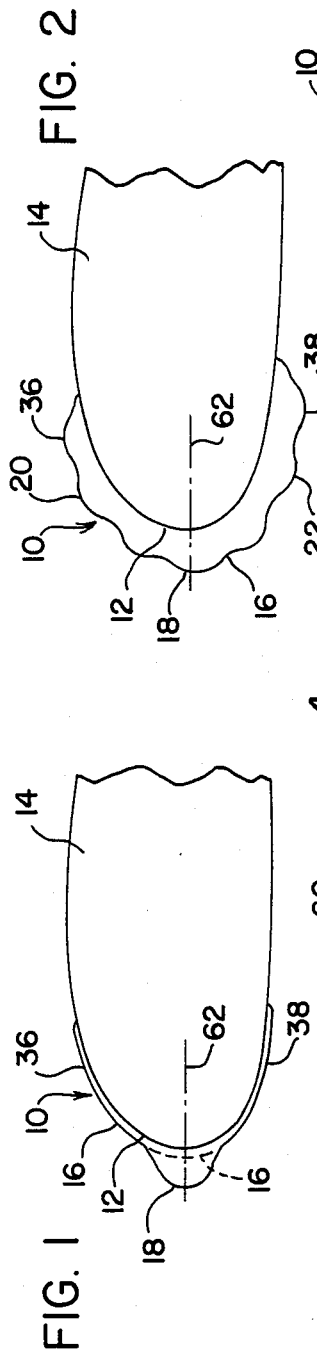
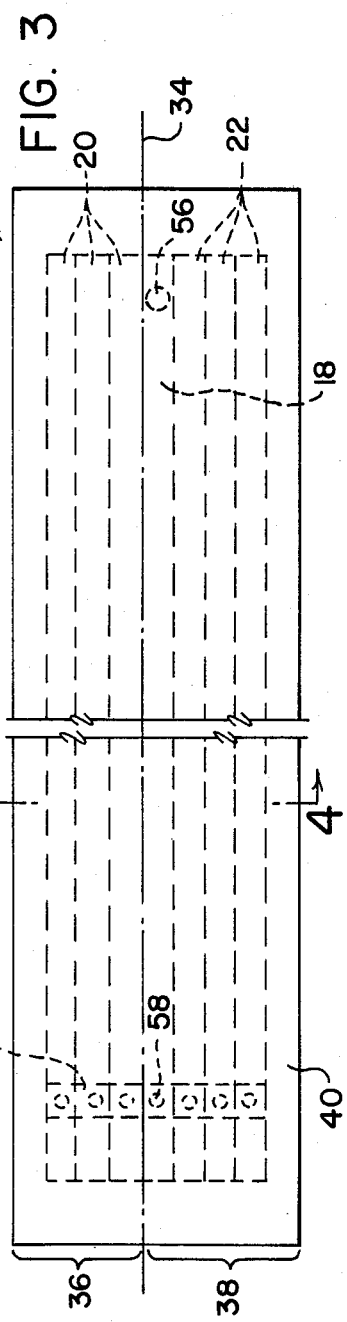
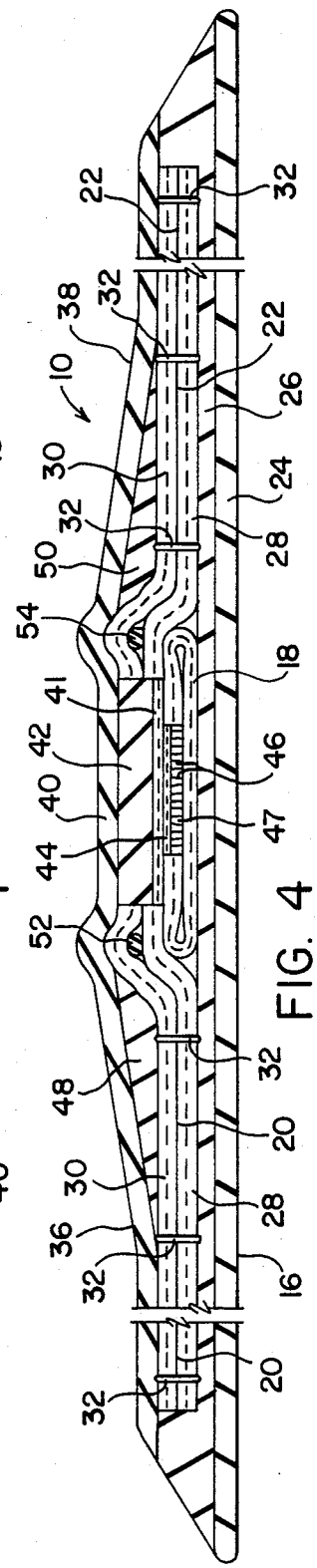

PNEUMATIC DEICER AND DEICING METHOD

BACKGROUND OF THE INVENTION

This invention relates to pneumatic deicers of the type in which a boot of resilient material such as rubber is attached to the leading edge of an airfoil and has inflatable passages which are alternately extended by inflation pressure to break up ice accumulation which tends to form on the surface of the airfoil. One of the problems with deicers used heretofore, especially on aircraft which travel at relatively slow speeds, has been the difficulty in cracking the ice cap which builds up at the leading edge. This ice cap in some cases has remained substantially intact and has been moved outwardly as a unit when the passages have been inflated rather than being cracked to facilitate total removal of the ice.

SUMMARY OF THE INVENTION

The pneumatic deicer of this invention provides a method and deicer construction which cracks the ice cap at the airfoil stagnation line during the initial part of the inflation sequence. This two-step inflation sequence may be provided by only one air pressure source and through one air connection so as to minimize the weight of the deicer and auxiliary equipment which is very important on aircraft.

In accordance with one aspect of the invention there is provided a method of removing ice from an inflatable deicer boot mounted on an airfoil comprising initially inflating at least one leading edge tubular member positioned in the area of the leading edge centerline of said boot for cracking said ice, inflating said other passages for a predetermined period of time after said tubular member is inflated for ejecting said ice, deflating said leading edge tubular member and said other inflatable passages for a second predetermined period of time and then repeating the cycle starting with inflation of said leading edge tubular member.

In accordance with another aspect of the invention there is provided an inflatable deicer boot for mounting on an airfoil, said boot having a leading edge centerline, said centerline dividing said boot into an upper section and a lower section, a plurality of upper inflatable passages in said upper section, a plurality of lower inflatable passages in said lower section, said boot being characterized by at least one leading edge tubular member positioned in the area of said leading edge centerline and means to inflate said leading edge tubular member prior to inflation of said upper and lower inflatable passages for cracking of ice formed on the outside surface of said boot at said leading edge centerline whereby the ejection of the ice covering said upper and lower sections of said boot is facilitated.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the drawings:

FIG. 1 is a schematic end view of an airfoil showing the surface configuration of a deicer boot embodying the invention during the initial part of the inflation sequence.

FIG. 2 is a schematic end view like FIG. 1 showing the surface configuration of the deicer boot in the latter part of the inflation sequence.

FIG. 3 is a plan view of the deicer boot with the position of the inflatable passages, manifold and air inlet port being shown in dotted lines and parts being broken away.

FIG. 4 is an enlarged sectional view taken along the line 4—4 of FIG. 3 with parts being broken away.

DETAILED DESCRIPTION

Referring to FIGS. 1 and 2, an inflatable deicer boot 10 is shown mounted on a leading edge 12 of an airfoil 14. In the deflated condition of the deicer boot 10, an outside surface 16 has a configuration, shown in solid and dotted lines, which substantially conforms with the surface of the leading edge 12 of the airfoil 14. During the inflation sequence of the deicer boot deicing cycle, a leading edge tubular member 18 is initially inflated to the configuration of the outside surface 16 shown in solid lines in FIG. 1 to crack the ice cap which forms on the boot 10. Following the inflation of the leading edge tubular member 18, upper inflatable passages 20 and lower inflatable passages 22 are inflated so that the outside surface 16 of the deicer boot 10 will have a configuration such as that shown in solid lines in FIG. 2. After the leading edge tubular member 18 and upper and lower inflatable passages 20 and 22 have been inflated for a predetermined time, the air is removed from the deicer boot 10 and the outside surface 16 returns to the configuration shown in FIG. 1 in solid and dotted lines. The deicer boot 10 remains in the deflated condition for a predetermined time and then the deicing cycle is repeated starting with the inflation sequence described hereinabove.

The deicer boot 10 is shown in greater detail in FIGS. 3 and 4 where it is in the condition prior to installation on the airfoil 14. The deicer boot 10 has a surface ply 24 which may be of neoprene. The outer surface ply 24 is adhered to a gum ply 26 of resilient rubber or other rubberlike material. Fastened to the gum ply 26 is the leading edge tubular member 18 and a two-piece outer ply 28 of suitable fabric. The outer ply 28 is sewn to a two-piece inner ply 30 by stitches 32 to provide a sewn carcass construction with the upper inflatable passages 20 and lower inflatable passages 22.

The deicer boot 10 has a leading edge centerline 34 which divides the boot into an upper section 36 and a lower section 38 with the lower inflatable passages 22 in the lower section and the upper inflatable passages 20 in the upper section. As shown in FIG. 4, the deicer boot 10 is covered by an inner surface ply 40 of neoprene or other suitable material. The leading edge tubular member 18 may be of fabric reinforced resilient rubberlike material with spaced-apart edges fastened to a coated fabric tape 41 which is attached to a gum filler member 42. A fabric strip 44 is also fastened to the tape 41 in the space between the edges of the tubular member 18. The fabric strip 44 has a plurality of closely spaced elements such as stiff fibers 46 projecting toward an opposing surface of the tubular member 18 forming a bleeder channel 47.

Tapered fillets 48 and 50 may be positioned between the inner surface ply 40 and the inner ply 30 to provide a smooth surface 16 of the boot 10. Also sealing strips 52 and 54 are provided between the outer ply 28 and inner ply 30 at the edges of the leading edge tubular member 18 as shown in FIG. 4.

An air inlet and outlet opening 56 is provided at one end of the tubular member 18 which in this embodiment is the inboard end. The air inlet and outlet opening 56 is in communication with suitable inflation and deflation means for conveying air under pressure to the deicer boot 10 and evacuating air from the boot. An air opening 58 is provided in the leading edge tubular member 18 at the outboard end of the boot 10 for the communication of air between the leading edge tubular member and the upper inflatable passages 20 and lower inflatable passages 22 as through a manifold 60.

As shown in FIGS. 1 and 2, the leading edge tubular member 18 is positioned in the area of the leading edge centerline 34 which is preferably positioned in the area of a stagnation line 62 of the airfoil 14 when the aircraft is in a normal flight attitude.

In the operation of the deicer boot 10, the deicing cycle has an inflation sequence including the first initial inflation of the leading edge tubular member 18. Air is injected into air inlet opening 56 at a suitable pressure which for this embodiment is around 18 pounds per square inch. This causes the tubular member 18 to inflate to the position shown in FIG. 1 for cracking the ice cap in the area of stagnation line 62.

After the initial inflation, the air passes through opening 58 and into the manifold 60 whereupon the upper inflatable passages 20 and lower inflatable passages 22 are inflated to the position shown in FIG. 2 which further shatters the ice layers of the ice cap from the upper section 36 and lower section 38 of the deicer boot 10. The application of inflation air is then discontinued and a vacuum applied to the air inlet and outlet opening 56 whereupon the air in the upper and lower inflatable passages 20 and 22 flows to the manifold 60 and air opening 58 through a multitude of minute passages in uncoated surfaces of the outer ply 28 and inner ply 30. The inflation air then passes through the air opening 58 into the leading edge tubular member 18 which conveys the air to the air inlet and outlet opening 56 through the bleeder channel 47 provided by the interstices between the stiff fibers 46 in the tubular member.

In accordance with the embodiment shown in FIGS. 1 through 4, the two-step inflation sequence is provided with only one air pressure source connected to the air inlet and outlet opening 56; however, it is understood that two sources may be used with separate valves connecting the sources to the leading edge tubular member 18 and to the upper and lower inflatable passages 20 and 22. It is also understood that where desirable two or more leading edge tubular members 18 may be provided in the area of the leading edge centerline 34 for cracking the ice cap in the area of the airfoil stagnation line 62.

The air pressure and the time during which the deicer boot is inflated is determined in accordance with the ice buildup on the deicer boot 10. In the operation of the embodiment shown, the leading edge tubular member 18 and upper and lower inflatable passages 20 and 22 are inflated for about four to six seconds. Also the air inlet and outlet opening 56 and the air opening 58 may be positioned near the ends of the deicer boot 10. In the present embodiment the air inlet and outlet opening 56 and the air opening 58 are located within about two to six inches from the ends of the leading edge and the tubular member 18 which has a length of from about 50 to 250 inches. In this embodiment the upper and lower inflatable passages 20 and 22 are part of a sewn carcass; however, the passages may be continuous integral tubes like the leading edge tubular member 18 connected to the manifold 60.

In operation, after the inflating air has been removed from the boot 10 in a deflating operation, the boot remains in the deflated condition with the outside surface 16 of the boot having a configuration such as that shown in FIG. 1 in dotted and solid lines for a predetermined period of time. Thereafter the deicing cycle is repeated starting with the inflation of the leading edge tubular member 18.

While a certain representative embodiment and details has been shown for the purpose of illustrating the invention, it will be apparent to those skilled in the art that various changes and modifications other than those referred to may be made therein without departing from the invention.

We claim:

1. A pneumatically inflatable deicer boot for mounting on an airfoil, said boot having a leading edge centerline, said centerline dividing said boot into an upper section and a lower section, said upper section and lower section being formed of two piece fabric outer plys and inner plys sewn to provide a carcass providing a plurality of upper inflatable passages in said upper section and a plurality of lower inflatable passages in said lower section, the fabric supporting air transport within the boot, said boot being characterized by at least one leading edge, continuously integral, tubular member formed of resilient rubberlike material with spaced apart edges and including a fabric strip fastened to a fabric tape backed by a filler member bridging the edges, the fabric strip having a plurality of stiff fibers defining a channel; the tubular member being positioned in the area of said leading edge centerline; and means to substantially inflate said leading edge tubular member and thence operative to inflate said upper and lower inflatable passages while maintaining substantial inflation of said leading edge tubular member for cracking of ice formed on the outside surface of said boot at said leading edge centerline whereby the ejection of ice covering said upper and lower sections of said boot is facilitated.

2. An inflatble deicer boot in accordance with claim 1 wherein said means to inflate said leading edge tubular member prior to inflation of said upper and lower inflatable passages includes an air inlet and outlet opening at one end of said tubular member and an air opening at the other end with said air opening in communication with said upper and lower inflatable passages.

3. An inflatable deicer boot in accordance with claim 2 wherein said air outlet is connected to a manifold in communication with all of said upper and lower inflatable passages.

4. A method of removing ice from a pneumatically inflatable deicer boot configured for mounting on an airfoil and having a plurality of spanwise passageways formed of two piece fabric plys sewn to provide said passageways including a continuously integral tubular member formed of resilient rubberlike material with spaced apart edges and including a fabric strip fastened to a fabric tape backed by a filler member bridging the edges, the fabric strip having a plurality of stiff fibers defining a channel, located on leading edge of such airfoil, comprising initially inflating said tubular member positioned in the area of the leading edge centerline of said boot for cracking ice, thence inflating the remaining of said fabric formed passageways for a predetermined period of time after said leading edge tubular member is substantially inflated for ejecting ice, deflating said leading edge tubular member and other inflatable passageways for a second predetermined period of time and then repeating the cycle starting with inflation of said leading edge tubular member.

5. The method of FIG. 4 wherein said leading edge tubular member and said other passages are inflated for about four to six seconds.

6. The method of FIG. 4 wherein a vacuum is applied to said boot for deflating said leading edge tubular member and said other passages.

* * * * *

UNITED STATES PATENT AND TRADEMARK OFFICE
CERTIFICATE OF CORRECTION

PATENT NO. : 4,516,745
DATED : MAY 14, 1985
INVENTOR(S) : DUAIN NORVAN ELY, ET AL

It is certified that error appears in the above-identified patent and that said Letters Patent are hereby corrected as shown below:

On line 1 of Claims 5 and 6, the reference to "FIG. 4" should be changed to read --Claim 4--.

Signed and Sealed this

Eighth Day of December, 1987

Attest:

DONALD J. QUIGG

Attesting Officer

Commissioner of Patents and Trademarks